United States Patent [19]

Shimizu

[11] Patent Number: 4,756,376
[45] Date of Patent: Jul. 12, 1988

[54] ELECTRIC POWER STEERING SYSTEM FOR VEHICLES

[75] Inventor: Yasuo Shimizu, Tochigi, Japan

[73] Assignee: Honda Giken Kogyo Kabushiki Kaisha, Tokyo, Japan

[21] Appl. No.: 53,577

[22] Filed: May 22, 1987

Related U.S. Application Data

[63] Continuation of Ser. No. 798,270, Nov. 15, 1985, abandoned.

[30] Foreign Application Priority Data

Nov. 16, 1984 [JP] Japan ................... 59-241959

[51] Int. Cl.⁴ .................. B62D 5/04; G05B 11/10
[52] U.S. Cl. ..................... 180/79.1; 318/489
[58] Field of Search .............. 180/79.1, 79.3, 141, 180/142; 318/139, 488, 489; 74/388 PS

[56] References Cited

U.S. PATENT DOCUMENTS

| | | | |
|---|---|---|---|
| D. 267,359 | 12/1982 | Mustard | D34/26 |
| D. 269,726 | 7/1983 | Skille | D34/24 |
| 2,809,847 | 10/1957 | Sperlich | 280/47.24 |
| 3,827,707 | 8/1974 | Bierman | 280/47.24 |
| 3,983,953 | 10/1976 | Bayle | 180/79.1 |
| 4,083,422 | 4/1978 | Blakeslee et al. | 180/168 |
| 4,264,081 | 4/1981 | Markham | 280/47.34 |
| 4,448,275 | 5/1984 | Kitagawa | 180/79.1 |
| 4,469,341 | 9/1984 | Creim | 280/47.26 |
| 4,473,128 | 9/1984 | Nakayama et al. | 180/142 |
| 4,518,055 | 5/1985 | Yagi et al. | 180/142 |
| 4,522,278 | 6/1985 | Kitagawa | 180/79.1 |
| 4,527,653 | 7/1985 | Agarwal et al. | 180/79.1 |
| 4,530,413 | 7/1985 | Buike | 180/79.1 |
| 4,532,567 | 7/1985 | Kade | 180/79.1 X |
| 4,538,698 | 9/1985 | Hashimoto et al. | 180/79.1 |
| 4,556,116 | 12/1985 | O'Neil | 180/79.1 |
| 4,557,342 | 12/1985 | Drutchas | 180/132 |
| 4,561,515 | 12/1985 | Hashimoto et al. | 180/79.1 |
| 4,570,734 | 2/1986 | Taig | 180/79.1 |
| 4,573,545 | 3/1986 | Kalns | 180/79.1 |
| 4,574,903 | 3/1986 | Hashimoto | 180/79.1 |
| 4,577,716 | 3/1986 | Norton | 180/79.1 |
| 4,580,648 | 4/1986 | Murakami et al. | 180/79.1 |
| 4,580,649 | 4/1986 | Ohe et al. | 180/79.1 |
| 4,582,155 | 4/1986 | Ohe | 180/79.1 |

FOREIGN PATENT DOCUMENTS

| | | |
|---|---|---|
| 2056066 | 5/1972 | Fed. Rep. of Germany . |
| 2242009 | 3/1975 | France . |
| 52-71028 | 6/1977 | Japan . |
| 58-105876 | 6/1983 | Japan . |
| 58-141963 | 8/1983 | Japan . |
| 2145678 | 3/1985 | United Kingdom . |
| 2167025 | 5/1986 | United Kingdom ............... 180/79.1 |

Primary Examiner—David M. Mitchell
Assistant Examiner—Mitchell J. Hill
Attorney, Agent, or Firm—Armstrong, Nikaido, Marmelstein & Kubovcik

[57] ABSTRACT

In an electric power steering system (200) for vehicles including a driving control circuit (100) for feeding a driving control signal (Va) to a direct-current motor (20), which supplies auxiliary torque to an output shaft (4) mechanically interconnected through an interconnection member (8) with an input shaft (1). The auxiliary torque is supplied in accordance with an output signal (Vr, V1) from a torque detection mechanism (13) for the detection of steering torque (Ti) acting on the input shaft (1).

The driving control signal (Va) comprises an armature voltage (Va) of the motor (20) having a value thereof proportional to the magnitude of the steering torque (Ti) acting on the input shaft (1).

3 Claims, 3 Drawing Sheets

ELECTRIC POWER STEERING SYSTEM FOR VEHICLES

This application is a continuation of application Ser. No. 798,270 filed Nov. 15, 1985 now abandoned.

BACKGROUND OF THE INVENTION

1. Field of the Invention

The present invention generally relates to a power steering system for vehicles. More particularly, it relates to an electric type power steering system for vehicles.

2. Description of Relevant Art

In view of problems on the hydraulic type power steering system such as that the structure thereof is complicated, recent years have proposed a variety of electric type power steering systems for vehicles.

Exemplarily, in Japanese Patent Application Lay-Open Print No. 59-70257, laid open on Apr. 20, 1984, there is disclosed an electric power steering system for vehicles.

This electric power steering system for vehicles includes an input shaft as a steering shaft connected to a steering wheel, an output shaft interconnected through a universal joint with the input shaft and through a gear mechanism of a rack and pinion type with a tie rod of a steered wheel, an electric motor for supplying auxiliary torque through a reduction gearing to the output shaft, a torque detection mechanism disposed on the input shaft to detect steering torque acting on the input shaft, and a driving control circuit to produce, based on a detection signal from the torque detection mechanism, a torque magnitude signal and a torque direction signal representing the magnitude and the direction of the steering torque acting on the input shaft, respectively, and to feed the electric motor with an armature current, a proportional relation in the quantity thereof to the torque magnitude signal and in accordance in the direction of conduction thereof with the torque direction signal. The torque detection mechanism consists of a strain gauge sensor.

With such an arrangement, when the steering wheel is operated, the output shaft is applied with adequate auxiliary torque from the electric motor, so that the steering operation is facilitated.

In the electric power steering system described, however, the driving of the electric motor is controlled in such a manner that the auxiliary torque of which magnitude is substantially proportional to the that of the steering torque acting on the input shaft, is applied to the output shaft, irrespective of the speed of the rotating operation of the steering wheel.

In this respect, there is a desideratum associated with a preference that the electric motor should be controlled so as to supply auxiliary torque to the output shaft in consideration of the rotating speed of the steering wheel.

The present invention has been achieved to accomplish such desideratum in a conventional electric power steering system for vehicles.

SUMMARY OF THE INVENTION

Accordingly, an object of the present invention is to provide an electric power steering system for vehicles, in which the driving of an electric motor to supply auxiliary torque for an output shaft is permitted to be controlled in consideration of the speed of rotational operation of a steering wheel, thereby achieving preferable maneuverability.

To achieve such an object, the present invention provides an electric power steering system for vehicles including an input shaft operatively connected to a steering wheel, an output shaft operatively connected to a steered wheel, an interconnecting member for mechanically substantially interconnecting the input shaft and the output shaft with each other, a direct-current motor for operatively supplying auxiliary torque to the output shaft, a torque detection means for detecting steering torque acting on the input shaft, and a driving control circuit for feeding the motor with a driving control signal in accordance with an output signal from the detection means, wherein the driving control signal comprises an armature voltage of the motor having a value thereof proportional to the magnitude of the steering torque acting on the input shaft.

The above and further features, objects and advantages of the present invention will more fully appear from the following detailed description of a preferred embodiment of the invention when the same is read in conjunction with the accompanying drawings.

DETAILED DESCRIPTION OF THE PREFERRED EMBODIMENT

Figure 1:
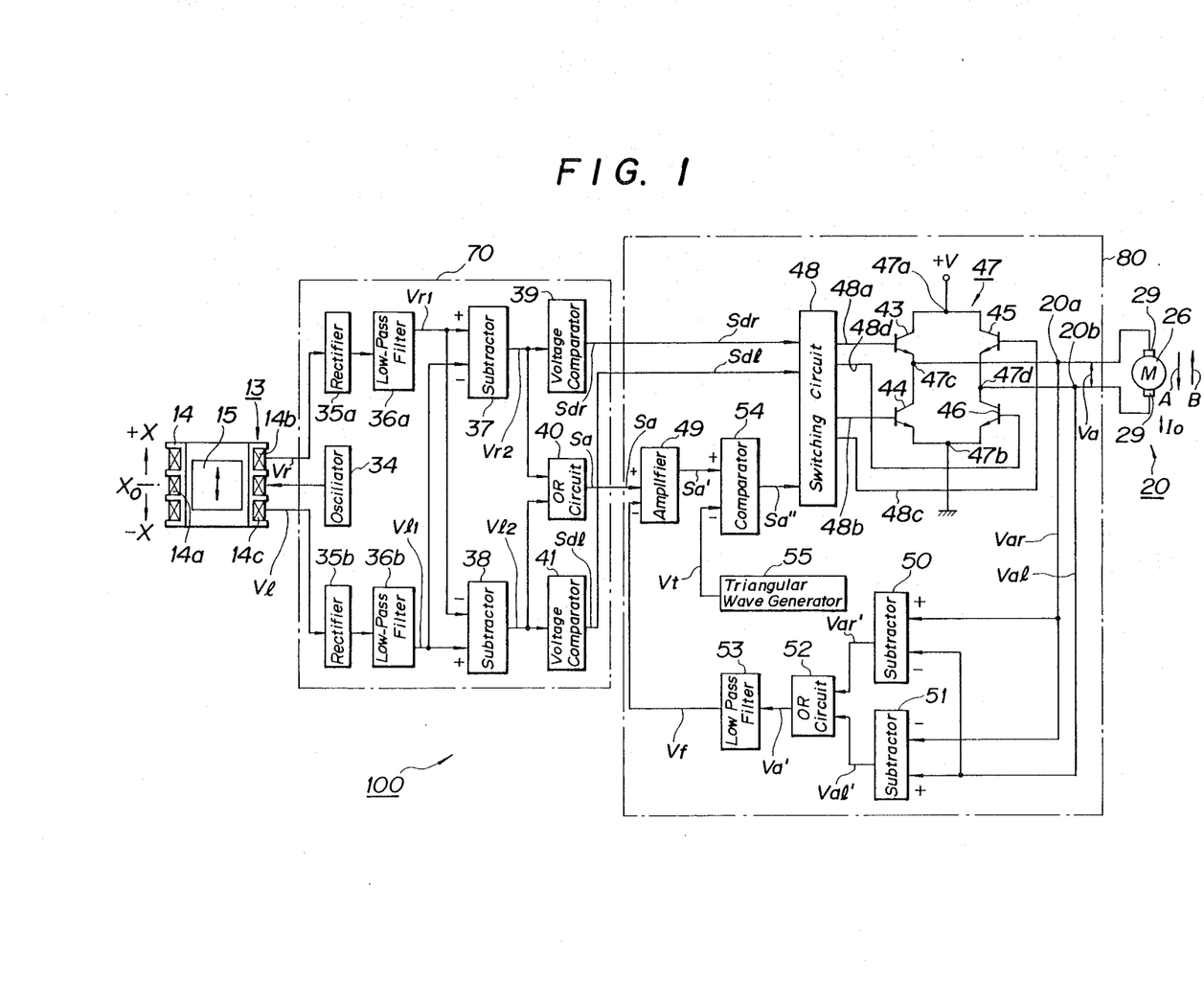
FIG. 1 is a block diagram of a driving control circuit of an electric power steering system for vehicles according to a preferred embodiment of the present invention.

With reference to FIG. 1, designated at reference numeral 100 is the entirety of a driving control circuit of an electric power steering system according to a preferred embodiment of the present invention, as it is equipped in a vehicle (not shown). In FIGS. 2A to 2D are shown characteristic curves of some of later-described signals to be output from essential circuit elements of the driving control circuit 100. A structural presentation of the electric power steering system is given in FIG. 3, which is a longitudinal sectional view of an essential part of the power steering system designated by reference numeral 200, controlled by the driving control circuit 100, and FIGS. 4A to 4C are sectional views respectively of a later-described torque detection mechanism of the steering system 200.

For the aid of comprehension, there will be first described the mechanical structure of the electric power steering system 200 with reference to FIGS. 3 and 4A to 4C, before entering the description of the constitution as well as function of the driving control circuit 100.

Figure 3:
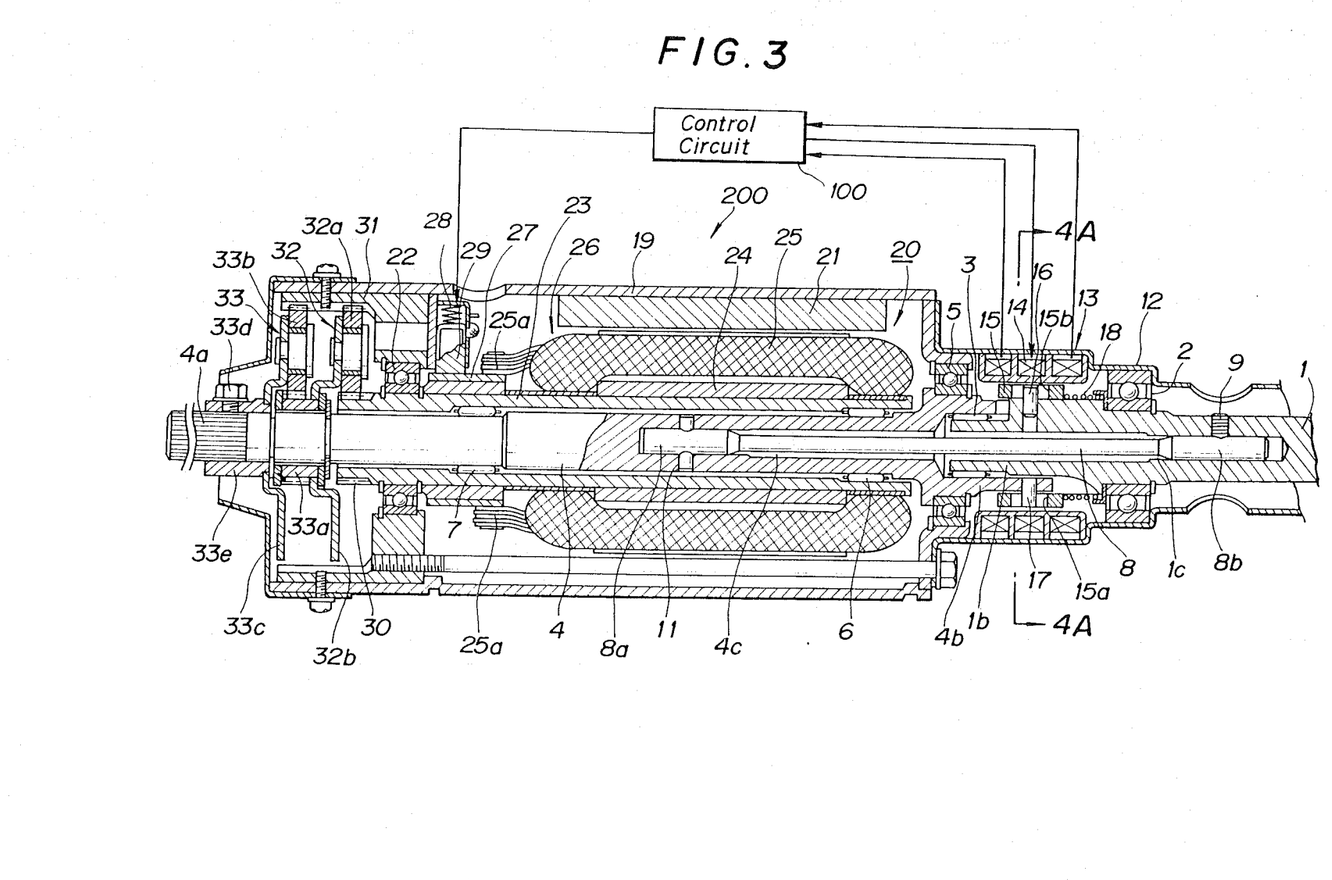
FIG. 3 is a longitudinal sectional view of an essential part of the electric power steering system that is controlled by the driving control circuit of FIG. 1.
Figures 4A, 4B, 4C:
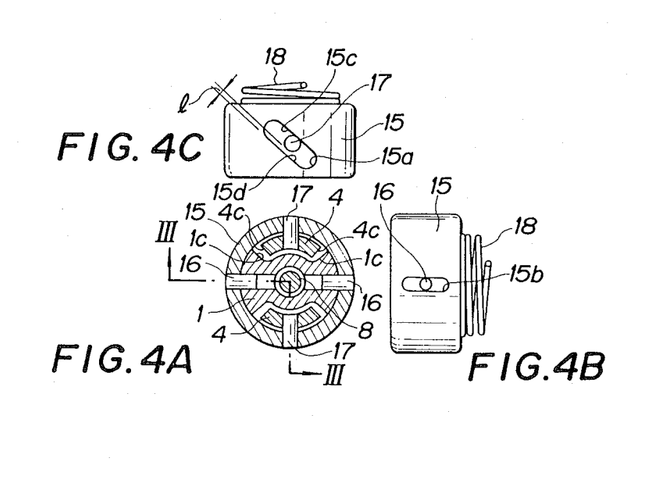
FIG. 4A is a sectional view, showing an essential part of a torque detection mechanism for detecting steering torque acting on an input shaft of the electric power steering system, along line 4A—4B of FIG. 3.
FIGS. 4B and 4C are top and side views showing a mobile member of the torque detection mechanism of FIG. 4A, respectively.

Shown in FIG. 3 is the sectional view as described, and more particularly, a quarter cutaway longitudinal sectional view of the essential part of the steering system 200.

The system 200 includes a steering linkage having an input shaft 1 and an output shaft 4 interconnecting a steering wheel and a steered wheel. An input shaft 1 rotatably supported by a ball bearing 2 as well as by a needle bearing 3 and connected at the axially outer end thereof to a steering wheel (not shown). A output shaft 4 is arranged coaxial with the input shaft 1 and operatively interconnected with the input shaft 1 through a torsion bar 8 disposed coaxial with the input shaft 1. Also the output shaft 4 is rotatably supported by a ball bearing 5 and needle bearings 6, 7. The output shaft 4 has at the axially outer end thereof a splined portion 4a for connecting the shaft 4 to a rack and pinion type steering gearbox (not shown).

The input shaft 1 has a reduced axially inner end portion 1b engaged at the innermost end thereof into an expanded axially inner end portion 4b of the output shaft 4, where it is rotatably supported with the needle bearing 3 interposed therebetween.

The torsion bar 8 is inserted along the left half length thereof in an axial hollow 4c of the output shaft 4, and secured at a left end part 8a thereof to the output shaft 4 by means of a pin 11 perpendicularly pushed into the end part 8a. The right half of the torsion bar 8 is inserted in an axial hollow 1c of the input shaft 1, and secured at a right end part 8b thereof to the input shaft 1 by means of a screw 9, whereby the input shaft 1 is to have, while no steering torque is acting thereon, a predetermined circumferencewise angular position or neutral position thereof relative to the output shaft 4.

In the foregoing arrangement, steering torque from the steering wheel is applied to the input shaft 1, and transmitted therefrom through the torsion bar 8 to the output shaft 4, causing torsional deformations in the torsion bar 8.

In FIG. 3, designated at reference numeral 12 is a steering column surrounding to accommodate therein the input shaft 1.

The system 200 has, at a position thereof where the inner end portion 1b of the input shaft 1 is engaged into the inner end portion 4b of the output shaft 4, a torque detection mechanism 13 arranged so as to extend therearound and to detect steering torque acting on the input shaft 1 by detecting a relative angular displacement circumferencewise developed as a phase difference between the input shaft 1 and the output shaft 4. The detection mechanism 13 is constituted with a differential transformer 14 fixed to the inner circumference of the steering column 12, and with a tubular mobile member 15 as a laminated iron core axially slidably fitted around the mutually engaged portions 1b, 4b of the input and the output shafts 1, 4. The differential transformer 14 has a pair of output terminals thereof connected to the driving control circuit 100, which is in part to electrically detect the relative angular displacement between the input and the output shafts 1, 4. The driving control circuit 100 applied a controlled voltage of a controlled polarity across an electric motor 20, thereby feeding the motor 20 with an armature current Io (FIG. 1), as required to drive the motor 20 in accordance with the magnitude and the acting direction of auxiliary torque that the motor 20 is desired to output.

As shown in FIG. 4A, the mobile member 15 is engaged with the input shaft 1 by means of a pair of radial pins 16, 16 fixed to the input shaft 1, and with the output shaft 4 by means of another pair of radial pins 17, 17 fixed to the output shaft 4. The radial pins 17, 17 are each respectively circumferencewise spaced apart at a phase difference of 90° from one of the radial pins 16, 16. For the engagement with the radial pins 16, 16 projecting from the input shaft 1, the mobile member 15 has a pair of engagement holes 15b formed therethrough at corresponding circumferential positions so as to elongate in the axial direction of the torsion bar 8. Also for the engagement with the radial pins 17, 17 projecting from the output shaft 4, the mobile member 15 is formed therethrough with a pair of engagement holes 15a which are elongated at a skewed angle with respect to the axial direction of the torsion bar 8. The mobile member 15 is normally biassed in the axial direction, to the left in FIG. 3, with a coil spring 18 compressed to be interposed between this member 15 and the aforesaid ball bearing 2.

In the foregoing arrangement, between each of the radial pins 17 and corresponding one of the elongate holes 15a is given a clearence due to the precision of workmanship. However, at either side 15c of the working side of the hole 15a, any play due to such a clearance between the pin 17 and the hole 15a is substantially eliminated by the presence of the spring 18 that normally urges the pin 17 into abutment with the working side 15c, while the other side 15d of the hole 15a has a corresponding play l left against the pin 17.

According to the foregoing arrangement, when the input shaft 1 is forced to rotate by steering torque applied to the steering wheel, thus transmitting torque through the torsion bar 8 to the output shaft 4, there is developed a circumferencewise relative angular difference, i.e., the relative angular displacement between the input and the output shafts 1, 4 causing the mobile member 15 to axially move, to the right or left in FIG. 3, in accordance with the direction of rotation as well as the absolute value of the angular difference that the input shaft 1 is then forced to experience relative to the output shaft 4. Since the axial movement of the mobile member 15 is proportional to the relative angular displacement between the shafts 1, 4, the latter is detected by electrically detecting the former through the differential transformer 14.

As shown in FIG. 3, the system 200 includes a cylindrical casing 19 accommodating therein the electric motor 20 as a direct-current machine coaxially arranged around the output shaft 4. The electric motor 20 is constituted with a pair of magnets 21 as a field fixed to the inner circumference of the casing 19, and with a rotor 26 as an armature consisting of a tubular shaft 23 which is rotatably supported by the needle bearings 6, 7 and a ball bearing 22, and an armature core 24 which is fixed on the tubular shaft 23 and provided with an armature winding 25 arranged to as to cut, when rotated, those lines of magnetic flux developed by the magnets 21. Further, the rotor 26 is provided at the left end thereof with a slip ring assembly 27, to which the armature winding 25 has terminals 25a thereof connected in such a manner as to permit the armature current Io of necessary quantity to be sent therethrough in either direction of conduction as required. At each necessary electrical angular positions, a brush 29 is brought into abutment with the slip ring assembly 27, while being normally urged thereagainst with a coil spring 28. Through the brush 27, the armature current Io as controlled is sent from the driving control circuit 100 into the armature winding 25.

In the foregoing arrangement, with torque applied from the steering wheel to the input shaft 1, while the input and the output shafts 1, 4 have a relative angular displacement developed therebetween to be detected by the torque detection mechanism 13, the driving control circuit 100 is caused to function to send the armature current Io to the armature winding 25, thereby driving the electric motor 20, such that the rotor 26 rotates about the output shaft 4, independently thereof, in the same direction of rotation as the input shaft 1.

The rotation of the rotor 26 is transmitted to the output shaft 4, through a speed reducing mechanism consisting of a primary and a secondary planetary gearings 32, 33, where it is reduced in the speed and raised in the torque. In the speed reducing mechanism constituted with the two stages, 32, 33 of the planetary gear, the primary stage 32 consists of a primary sun gear 30 formed along the outer circumference of the left end part of the tubular shaft 23 as a primary input member. The right half of a common ring gear 31 is fixed to the inner circumference of the casing 19, and a triple of primary planet gears 32a is interengaged between the sun and the ring gears 30, 31. The primary planet gears 32a are pivotably supported on a disc-like flange 32b fixed to a secondary input member rotatably loose-fitted on the output shaft 4, which member has formed thereon a secondary sun gear 33a. On the other hand, the secondary stage 33 consists of the secondary sun gear 33a, the left half of the ring gear 31, and a triple of secondary planet gears 33b, interengaged between the sun and the ring gears 33a, 31. The secondary planet gears 33b are pivotably supported on a disc-like flange 33c integrally joined with a tubular member 33e, which member 33e is spline-fitted on a part of the splined portion 4a of the output shaft 4 and further fixed by a radial bolt 33d also to the same shaft 4.

Accordingly, when steering torque is applied to the input shaft 1, the output shaft 4 receives besides the torque to be transmitted thereto from the input shaft 1 through the torsion bar 8, additional torque developed by electromagnetic actions of the electric motor 20 arranged around the output shaft 4 and transmitted through the speed reducing mechanism, whereby auxiliary torque is supplied to the output shaft 4. As a result, there is achieved a power assist function of the electric power steering system 200.

From FIG. 4A, when the relative angular displacement between the input and the output shafts 1, 4 is enlarged to a predetermined angle (approx. 10° in this embodiment), circumferencewise moving side faces 1c of the axially inner end portion 1b of the input shaft 1 are brought into abutment, to be locked, with corresponding ones of circumferencewise locking side faces 4c of the axially inner end portion 4b of the output shaft 4, thereby preventing the relative angular displacement from further developed increasing, while mechanically and directly transmitting the rotation of the input shaft 1, that is, steering torque acting thereon, to the output shaft 4. In other words, with such a locking structure between the input and the output shafts 1, 4 as well as with the torsion bar 8, the power steering system 200 has built therein a fail-safe mechanism.

Referring now to FIGS. 1 and 2A to 2D, there will be described below the constitution as well as the function of the driving control circuit 100 to control the action of the electric power steering system 200.

As shown in FIG. 1, the control circuit 100 consists of a torque-representative signal producing circuit 70 receiving a pair of detection signals Vr, Vl output from the torque detection mechanism 13. The circuit 70 is to produce a pair of torque direction signals Sdr, Sdl and a torque magnitude signal Sa in accordance with the signals Vr, Vl. A motor driving circuit 80 receives the torque-representative signals Sdr, Sdl and Sa from the circuit 70. the circuit 80 is to apply a terminal voltage Va of a controlled polarity across the electric motor 20, thereby feeding the motor 20 with the armature current Io, in accordance the signals Sdr, Sdl and Sa.

First, a description of the torque-representative signal producing circuit 70 will follow.

The differential transformer 14 of the torque detection mechanism 13 has a primary winding 14a and a pair of secondary windings 14b, 14c. The primary winding 14a is excited with an alternating-current signal of a predetermined frequency fed from an oscillator 34. The secondary windings 14b, 14c are to output therefrom the detection signals Vr, Vl as a pair of alternating-current voltage signals with a differentially varying amplitude in accordance with the axial movement of the mobile member 15 of the transformer 14. The detection signals Vr, Vl from the secondary windings 14b, 14c are first rectified through a pair of rectifiers 35a, 35b, and smoothed by a pair of low-pass filters 36a, 36b, to be converted into a pair of direct-current voltage signals $Vr_1$, $Vl_1$, respectively.

The direct-current voltage signal $Vr_1$ is fed to a plus input terminal of a subtractor 37 and a minus input terminal of another subtractor 38, and the other direct-current voltage signal $Vl_1$ is fed a minus input terminal of the subtractor 37 and a plus input terminal of the subtractor 38.

In the foregoing arrangement, the mobile member 15 is to take the neutral position, which is designated by Xo in FIG. 1, when the relative angular displacement between the input and the output shafts 1, 4 is zero with no steering torque applied to the input shaft 1. Further, it is to move to the right in FIG. 4B, that is, upwardly in FIG. 4C, when the input shaft 1 when viewed at the side of the steering wheel is rotated to the right relative to the output shaft 4 with a load imposed on the shaft 4 while clockwise acting torque is applied to the input shaft 1. In this respect, the mobile member 15, as shown in FIG. 1, has a vertical direction thereof coincident with its vertical direction in FIG. 4C. Accordingly, when the input shaft 1 is clockwise rotated relative to the output shaft 4, the mobile member 15 is moved in an upward direction +X in FIG. 1. When the input shaft 1, viewed at the side of the steering wheel, is rotated counterclockwise relative to the output shaft 4 with a load imposed on the shaft 4 while counterclockwise acting torque is applied to the input shaft 1, the mobile member 15 is moved in a downward direction −X in FIG. 1.

As a result, under the condition that the mobile member 15 is put in the neutral position Xo as an original position thereof, the direct-current voltage signals $Vr_1$, $Vl_1$ are both given as a voltage of a predetermined or original level. Where the mobile member 15 is vertically moved from the neutral position Xo in FIG. 1, the signals $Vr_1$, $Vl_1$ are to have voltages thereof differentially varied from the original level in accordance with the vertical movement.

For example, when, in the torque detection mechanism 13, the mobile member 15 is upwardly displaced in FIG. 1 with the input shaft 1 clockwise rotated relative to the output shaft 4, the signal $Vr_1$ has a voltage higher than the original level by a rise proportional to the upward displacement of the member 15, while the voltage of the signal $Vl_1$ is caused to correspondingly fall. To the contrary, when the mobile member 15 is downwardly displaced in FIG. 1 with the input shaft 1 counterclockwise rotated relative to the output shaft 4, the voltage of the signal $Vl_1$ has a level raised from the original level in proportion to the downward displacement of the member 15, while the signal $Vr_1$ is dropped in a corresponding manner.

Further, the subtractor 37 has output therefrom a voltage signal $Vr_2$, such that $Vr_2 = Vr_1 - Vl_1$, and the subtractor 38 outputs another voltage signal $Vl_2$, such that $Vl_2 = Vl_1 - Vr_1$.

In this respect, the subtractor 37 is constituted such that the voltage signal $Vr_2$ output therefrom is kept substantially at a zero volt level, on the positive side, thus without becoming negative, while the input signal $Vr_1$ is lower than the signal $Vl_1$. Likewise, the voltage signal $Vl_2$ output from the subtractor 38 is kept substantially at the zero volt level, on the positive side, thus without becoming negative, while the input signal $Vl_1$ is lower than the signal $Vr_1$. As a result, under the condition that the mobile member 15 is placed in the neutral position Xo, the output signals $Vr_2$, $Vl_2$ of the subtractors 37, 38 are both kept substantially at the zero volt level, on the positive side.

The output signal $Vr_2$ of the subtractor 37 is input to a voltage comparator 39 and an OR circuit 40, and the output signal $Vl_2$ of the subtractor 38 to another voltage comparator 41 and the OR circuit 40.

At the OR circuit 40, the input signals $Vr_2$, $Vl_2$ are logically added to obtain the torque magnitude signal Sa to be output therefrom. The signal Sa is given as a voltage signal with a level proportional to the magnitude of torque Ti acting on the input shaft 1.

At the voltage comparators 39, 41, there are obtained the torque direction signals Sdr, Sdl to be output therefrom, respectively. The signals Sdr, Sdl are given as logical voltage signals to be at a "low" level when the input signal $Vr_2$ or $Vl_2$ is lower than a predetermined reference voltage Vc, respectively, and to be at a "high" level when the input signal $Vr_2$ or $Vl_2$ is not lower than the reference voltage Vc.

Therefore, when the input shaft 1 is clockwise rotated relative to the output shaft 4, the output signals Sdr, Sdl of the voltage comparators 39, 41 are set at the "high" and the "low" levels, respectively. To the contrary, when the input shaft 1 is counterclockwise rotated relative to the output shaft 4, the signal Sdr is set at the "low" level, and the signal Sdl at the "high" level. As a result, the direction of relative rotation of the input shaft 1 with respect to the output shaft 4 is identifiable from the logical state, that is, "high" or "low", of the signals Sdr, Sdl, which are herein called torque direction signals, as described, that represent the direction of the torque Ti acting on the input shaft 1.

Figures 2A, 2B:
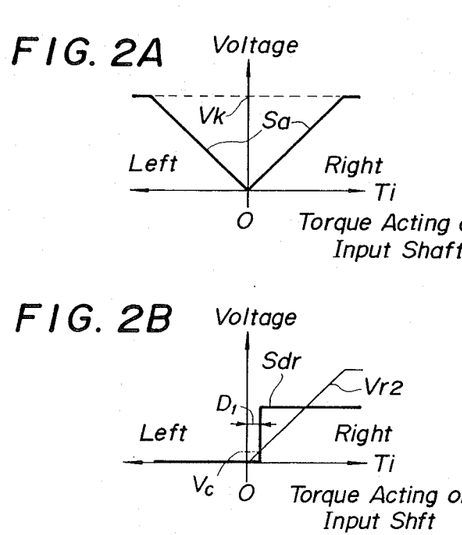
FIGS. 2A to 2D are graphs showing characteristic curves of output signals from some of principal circuit elements in the driving control circuit of FIG. 1, respectively.
Figure 2C:
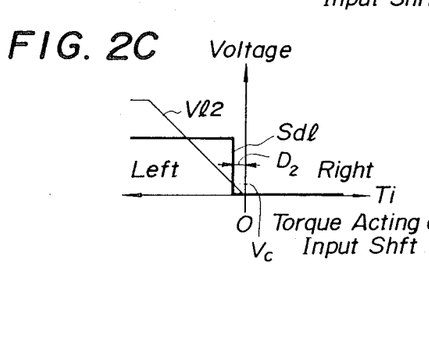

The torque magnitude signal Sa and the torque direction signals Sdr, Sdl have characteristic curves thereof inclined and stepped as shown in FIGS. 2A and 2B, 2C, respectively.

As shown in FIG. 2A, the torque magnitude signal Sa has an upper limit thereof at a voltage level Vk corresponding to such an angular displacement of the input shaft 1 as developed, relative to the output shaft 4, to the predetermined locking position (approx. 10°), where the fail-safe mechanism consisting of the respective axially inner end portions 1b, 4b of the shafts 1, 4 is put in service, keeping the relative angular displacement therebetween from beccomming larger.

Incidentally, in FIGS. 2B and 2C, designated at reference characters $D_1$ and $D_2$ are dead zones set for the torque direction signals Sdr and Sdl, respectively.

The torque magnitude signal Sa and the torque direction signals Sdr, Sdl as output from the torque-representative signal producing circuit 70 are all input to the motor drive circuit 80.

Hereinbelow, description will be made of the drive circuit 80, with reference again to FIG. 1.

The torque magnitude signal Sa is lead to a plus input terminal of a differential amplifier 49, of which a minus input terminal is fed with a feedback signal Vf.

This feedback signal Vf is obtained in the following manner: The terminal voltage Va of the electric motor 20, which has a controlled polarity as detailed later, is given as a voltage rise between a pair of terminals 20a, 20b of the motor 20. The terminals 20a, 20b having potentials thereof lead out as voltage signals Var, Val, respectively. The signal Var from the terminal 20a is lead to a plus input terminal of a substractor 50 and a minus input terminal of another subtractor 51, and the signal Val from the terminal 20b to a minus input terminal of the subtractor 50 and a plus input terminal of the subtractor 51. At the subtractor 50, 51, the signals Var, Val are processed to obtain voltage signals Var', Val' to be output therefrom, respectively. The output signals Var', Val' of the subtractors 50, 51 are input to an OR circuit 52, where they are logically added to obtain a voltage signal Va' representing the voltage rise between the terminals 20a, 20b as the absolute value of an armature voltage. The voltage signal Va' is output through a low-pass filter 53, where it is smoothed to obtain the aforesaid feedback signal Vf.

In the differential amplifier 49 receiving the torque amplitude signal Sa and the feedback signal Vf, there is obtained a differential between these signals Sa and Vf, which is then amplified to be output therefrom as a direct-current voltage signal Sa'.

The voltage signal Sa' is fed to a plus input terminal of a comparator 54, where it is compared with a triangular voltage pulse signal Vt input to a minus input terminal of the comparator 54 from a triangular wave generator 55, thereby obtaining a rectangular pulse signals Sa" to be output from the comparator 54.

The rectangular pulse signal Sa" is output as a voltage signal having a source level Vcc when the direct-current voltage signal Sa' is higher than the triangular voltage pusle signal Vt. Accordingly, as exemplarily shown in FIG. 2D, the output signal Sa" of the comparator 54 is given as a rectangular pulse signal having a frequency synchronized with the triangular pulse signal Vt and a varying pulse width $W_1$ in proportion to the voltage level of the direct-current signal Sa' output from the amplifier 49.

Figure 2D:
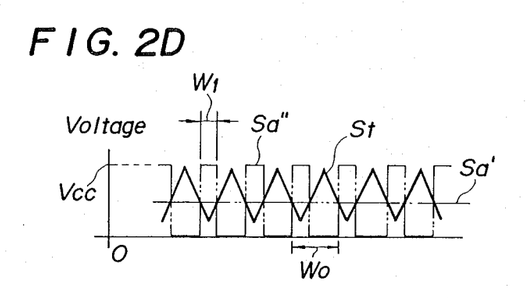

As will be understood from FIG. 2D, the rectangular pulse signal Sa" has a mean or effective voltage $VM_1$, such that $VM_1 = Vcc \times (W_1/Wo)$, where Wo is the pulse duaration of the signal Sa" synchronized with the signal Vt. The mean voltage $VM_1$ of the signal Sa" is proportional to the voltage level of the signal Sa', as a matter of course.

The rectangular pulse signal Sa" is input to a switching circuit 48 provided for the switching control of a bridge circuit 47 installed therebehind. To the switching circuit 48 are input the torque direction signals Sdr, Sdl, as well. The switching circuit 48 is to cause the bridge circuit 47 to apply the terminal voltage Va across the electric motor 20 with the terminal polarity controlled. The voltage Va has an effective value corresponding to the mean voltage $VM_1$ of the rectangular pulse signal Sa″, as will be described later.

The switching circuit 48 has output later-described control signals therefrom through four terminals 48a, 48b, 48c, 48d thereof connected to the bases of four npn transistors 43, 44, 45, 46 constituting four bridge sides of the bridge circuit 47, respectively. The bridge circuit 47 is constituted as a polarity and effective voltage determining switch circuit with the transistors 43 to 46 utilized as switching elements 15 thereof. The bridge sides of the transistors 43, 45 has a terminal 47a lead from therebetween to be connected as a supply side terminal to a positive terminal +V of a power supply (not shown). The bridge sides of the transistors 44, 46 has a terminal 47b lead from therebetween to be connected as an earth or ground side terminal to the ground. Also from between the sides of the transistors 43, 44 and between those of the transistors 45, 46 are lead terminals 47c, 47d, respectively, which are connected, as a pair of output terminals are reversible of the polarity in accordance with on-off actions of the transistors 43 to 46, to the terminals 20a, 20b of the electric motor 20, respectively.

In the foregoing circuit arrangement, the switching circuit 48 is constituted so as to conduct the rectangular pulse signal Sa″ to the bases of the transistors 43, 46 when the torque direction signal Sdr is "high" and the companion torque direction signal signal Sdl is "low", and to the contrary to those of the transistors 44, 45 when the former Sdr is "low" and the latter Sdl is "high".

Exemplarily, when the torque direction signal Sdr is set "high" with clockwise steering torque applied from the steering wheel to the input shaft 1, the rectangular pulse signal Sa″ from the comparator 54 is conducted to the bases of the transistors 43, 46, turning them on, so that the voltage Va is applied across the electric motor 20 with such a polarity as to send thereto the armature current Io in the direction of A in FIG. 1, whereby the rotor 26 of the motor 20 is driven to clockwise rotate in accordance with the direction of rotation of the input shaft 1 relative to the output shaft 4. As a result, clockwise acting torque of the rotor 26 is transmitted through the speed reducing mechanism 32, 33, to be supplied as auxiliary torque to the output shaft 4.

To the contrary, when the torque direction signal Sdl is set "high" with counterclockwise steering torque applied from the steering wheel to the input shaft 1, the rectangular pulse signal Sa″ is conducted to the bases of the transistors 44, 45, turning them on, so that the voltage Va is applied across the electric motor 20 with such a polarity as to send thereto the armature current Io in the direction of B in FIG. 1, whereby the rotor 26 of the motor 20 is counterclockwise rotated. As a result, counterclockwise acting torque of the rotor 26 is transmitted through the speed reducing mechanism 32, 33, to be supplied as auxiliary torque to the output shaft 4.

Accordingly, the effective value of the voltage Va applied across the electric motor 20 corresponds to the mean voltage $VM_1$ of the rectangular pulse signal Sa″, and therefor proportional to the voltage level of the torque magnitude signal Sa.

In this respect, under the condition that the mobile member 15 of the torque detection mechanism 13 is placed in the neutal position Xo in FIG. 1 without steering torque applied to the input shaft 1, the torque magnitude signal Sa is maintained near the zero volt level and the torque direction signals Sdr, Sdl are both set "low", so that none of the transistors 43 to 46 of the bridge circuit 47 is turned on, thus leaving the voltage Va at a zero volt level, as will be understood from FIGS. 2A to 2C.

With such an arrangement, the motor drive circuit 80 is to feed the electric motor 20 with a control signal since the terminal voltage Va that has an effective value proportional to the voltage level of the torque magnitude signal Sa, which fundamentally is a signal representative of the magnitude of the torque Ti acting on the input shaft 1.

Moreover, a signal according to the terminal voltage Va is fed back as the signal Vf to the torque magnitude signal Sa, as described.

Herebelow, an evaluation will be made of the driving control of the electric motor 20 in conjunction with the feedback signal Vf.

The signals Var′, Val′ output from the subtractors 50, 51 are given as voltage signals, such that:

$$Var' = A_1 \times (Var - Val);$$

and $$Val' = A_1 \times (Val - Var),$$

where $A_1$ is an amplification factor, such that the output voltage Var′ or Val′ becomes substantially equal to zero, at the positive side, without going negative, if Var<Val for the subtractor 50 or Var<Val for the subtractor 51, like the case of the aforementioned subtractors 37, 38.

The output signal Va′ of the OR circuit 52 is obtained by taking the logical sum of the above signals Var′, Val′ and hence always has a voltage level corresponding to the absolute value of the voltage Va, in terms of effective value, as applied to the armature of the electric motor 20, such that:

$$Va' = A_1 \times |Var - Val| = A_1 \times |Va|.$$

The feedback signal Vf is a smoothed signal of this signal Va′, so that:

$$Vf = Va' = A_1 \times |Va|.$$

It will be understood that, in the drive circuit 80, the armature voltage Va to be proportional to the voltage of the torque magnitude signal Sa is stabilized by the signal Vf fed back to the signal Sa.

Under the condition that the rotor 26 of the electric motor 20 is rotated in either direction of rotation thereof with the thus applied voltage Va, letting the mean value as an effective value of the armature current Io be Im, the internal resistance of the motor 20 be Rm (>0), and the induction voltage as counter electromotive force of the motor 20 be Vs, it so follows that:

$$Va = Im \times Rm + Vs \qquad (1).$$

Further, with respect to the electric motor 20, letting the rotation speed be N in terms of r.p.m. and the coefficient of induction voltage be Ke in terms of volts per r.p.m., the induction voltage Vs in terms of volts has a relation to the rotation speed N, such that:

$$Vs = Ke \times N \quad (2).$$

Thus, substituting expression (2) to expression (1), $$Va = Im \times Rm + Ke \times N \quad (3).$$

In the electric power steering system 200 described hitherto, under such a condition that a load imposed at the road surface side on the output shaft 4 is of a constant magnitude Tr, when letting the necessary steering torque for operation to rotate the steering wheel and hence the input shaft 1 to be Th for a relatively high rotation speed Nh (r.p.m.) and to be Tl for a relatively low rotation speed Nl (r.p.m.), the magnitude relation therebetween will be determined as follows. In this connection, hereinbelow, there will be employed from place to place a suffix "low" or "l" referring to "low speed rotation" and a companion suffix "h" referring to "high speed rotation".

From the foregoing definition, naturally $$Nh > Nl \quad (4).$$

Applying the above-identified suffix to expression (3), $$Vah = Ih \times Rm + Ke \times Nh' \quad (5)$$

and $$Va\, low = Il \times Rm + Ke \times Nl' \quad (6),$$

where Nh' and Nl' are high and low rotation speeds (r.p.m.) of the electric motor 20, as will be comprehended.

On the other hand, since the input shaft 1 is interconnected through the torsion bar 8 with the output shaft 4 and moreover also the rotor 26 of the electric motor 20 is interconnected through the speed reducing mechanism 32, 33 to the output shaft 4, the rotation speed N of the motor 20 must be in correspondence to the number of revolutions per unit time of the input shaft 1.

Exemplarily, for a unit revolution number per unit time of the input shaft 1, that is, for one r.p.m. thereof, if the electric motor 20 is caused to rotate at a speed of $K_2$ r.p.m., the last terms Nh' and Nl' of expressions (5), (6) can be expressed such that:

$$Nh' = K_2 \times Nh$$

and $$Nl' = K_2 \times Nl.$$

By introducing a single factor $K_3$ in place of the product $Ke \times K_2$, expressions (5), (6) can be rewritten as follows:

$$Vah = Ih \times Rm + K_3 \times Nh \quad (7);$$

and $$Val = Il \times Rm + K_3 \times Nl \quad (8).$$

As already described, the armature voltage Va applied to the electric motor 20 has a varying effective value in proportion to the magnitude of the steering torque Ti acting on the input shaft 1. Therefore, when letting the factor of proportionality therebetween or an apparent amplification factor across the circuits 70, 80 be $A_3$, it so follows that:

$$Vah = A_3 \times Th \quad (9);$$

and $$Va\, low = A_3 \times Tl \quad (10).$$

Substituting expressions (9), (10) to expressions (7), (8), $$A_3 \times Th = Ih \times Rm + K_3 \times Nh \quad (11)$$

and $$A_3 \times Tl = Il \times Rm + K_3 \times Nl \quad (12).$$

The direct-current motor 20 has electromagnetically developed torque to be output therefrom as auxiliary torque To to the output shaft 4. The output torque To is proportional in the magnitude to the effective value as a mean value Im of the armature current Io. On the other hand, in the power steering system 200 through which a road wheel (not shown) is turned to be steered by the steering wheel, the load imposed in the form of torque Tr at the road surface side to be balanced with the sum of the steering torque Ti acting on the input shaft 1 and the auxiliary torque To output from the electric motor 20.

Accordingly, $$Tr = Th + K_4 \times Ih \quad (13)$$

and $$Tr = Tl + K_4 \times Il \quad (14),$$

where $K_4$ is the proportion factor between the armature current Im of the motor 20 and the output torque To thereof.

Subtracting expression (12) from expression (11) at both sides, while arranging the results by substituting terms Ih and Il as reduced from expression (13), (14), $$Th - Tl = K_3 \times (Nh - Nl)/(A_3 + Rm/K_4) \quad (15).$$

In factors at the right side of expression (15) above, Rm is a positive constant and also $A_3$, $K_3$, and $K_4$ are all positive. Moreover, from expression (4), $Nh - Nl > 0$ and hence the right side of expression (15) becomes positive when evaluated.

Thus, from expression (15), $Th - Tl > 0$

Therefore, $$Th > Tl \quad (15')$$

As will be understood from expression (15'), in the electric power steering system 200 in which the input shaft 1 is mechanically substantially interconnected through the torsion bar 8 to the output shaft 4 and moreover the electric motor 20 to supply auxiliary torque to the output shaft 4 is applied with the armature voltage Va proportional in the effective value to the magnitude of the steering torque Ti acting on the input shaft 1, there is achieved such an effect that, if the load Tr imposed at the road surface side is kept constant, the required steering torque Th for operation to rotate the steering wheel at the relatively high speed Nh is rendered larger in magnitude than the required steering torque Tl for operation to rotate the same at the relatively low speed Nl.

That the steering torque Th is larger than the steering torque Tl means that, as the speed of rotation of the steering wheel becomes high, the steering reaction becomes large, thus making the steering wheel all the more weighty.

In the foregoing embodiment of the present invention, the input shaft 1 and the output shaft 4 are arranged substantially coaxial with each other and mechanically substantially interconnected with each other through the torsion bar 8 disposed coaxial with both shafts 1, 4. In this respect, it will be comprehended that, in a modified example of the embodiment, an input shaft as voluntarily disposed and an output shaft as voluntarily disposed may advantageously be interconnected with each other through a combination of necessary mechanical connection members such as of a tie rod and a universal joint.

Although there has been described what is at present considered to be the preferred embodiment of the invention, it will be understood that the present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description.

I claim:

1. An electric power steering system for vehicles comprising:
    an input shaft connected to a steering wheel;
    an output shaft connected to a steered wheel;
    an interconnected member mechanically interconnecting said input shaft and said output shaft with each other;
    a direct-current motor operatively supplying auxiliary torque to said steering linkage;
    a torque detection means for detecting steering torque acting on said steering linkage; and
    a driving control circuit feeding and direct-current motor with a driving control signal in accordance with at least an output signal from said torque detection means, said driving control signal determining an armature voltage of said direct-current motor,
    said driving control circuit comprises
        a torque-representative signal producing circuit receiving said output signal from said torque detection means and producing, based on said output signal from said torque detection means, a torque magnitude signal representing a magnitude of said steering torque acting on said steering linkage, and
        a motor drive circuit having a differential amplifier and a feedback circuit, said feedback circuit feeding back said armature voltage from said direct-current motor to obtain a feedback signal, and said differential amplifier receiving said torque magnitude signal from said torque representative signal producing circuit and said feedback signal from said feedback circuit, and amplifying a difference therebetween for determining said driving control signal.

2. An electric power steering system according to claim 1, wherein:
    said input shaft and said output shaft are arranged substantially coaxial with each other; and
    said interconnecting member comprises a torsion bar disposed coaxial with both said input shaft and said output shaft.

3. An electric power steering system according to claim 1, further comprising:
    a speed reducing mechanism for transmitting motor torque developed at said motor to said output shaft, which reducing the speed thereof.

* * * * *